US012583284B2

(12) United States Patent
Goude et al.

(10) Patent No.: US 12,583,284 B2
(45) Date of Patent: Mar. 24, 2026

(54) VENTILATION DEVICE FOR A VENTILATION, HEATING AND/OR AIR CONDITIONING SYSTEM OF A MOTOR VEHICLE

(71) Applicant: VALEO SYSTEMES THERMIQUES, La Verriere (FR)

(72) Inventors: Sébastien Goude, La Verriere (FR); Thibaud Matharan, La Verriere (FR); Charlie Bricault, La Verriere (FR); Renan Leon, La Verriere (FR)

(73) Assignee: Valeo Systemes Thermiques, LaVerriere (FR)

( * ) Notice: Subject to any disclaimer, the term of this patent is extended or adjusted under 35 U.S.C. 154(b) by 225 days.

(21) Appl. No.: 18/555,034

(22) PCT Filed: Apr. 12, 2022

(86) PCT No.: PCT/EP2022/059796
§ 371 (c)(1),
(2) Date: Oct. 12, 2023

(87) PCT Pub. No.: WO2022/219001
PCT Pub. Date: Oct. 20, 2022

(65) Prior Publication Data
US 2024/0190205 A1    Jun. 13, 2024

(30) Foreign Application Priority Data
Apr. 12, 2021    (FR) ...................................... 2103707

(51) Int. Cl.
B60H 1/00          (2006.01)
(52) U.S. Cl.
CPC ...  B60H 1/00564 (2013.01); *B60H 2001/006* (2013.01)

(58) Field of Classification Search
CPC .......... B60H 2001/006; B60H 1/00564; G10K 11/172; F24F 2013/245; F01N 1/02;
(Continued)

(56) References Cited

U.S. PATENT DOCUMENTS 2,853,147 A * 9/1958 D Eustachio ........ G10K 11/172
                                                                         181/224
4,091,892 A * 5/1978 Hehmann ............ G10K 11/172
                                                                         181/252
(Continued)

FOREIGN PATENT DOCUMENTS

EP      2623732 A1 *  8/2013 ........... F01K 13/006
EP      3594585 A1    1/2020
(Continued)

OTHER PUBLICATIONS

European Patent Office, International Search Report (with English translation) and Written Opinion of corresponding International Application No. PCT/EP2022/059796, dated Jun. 20, 2022.

*Primary Examiner* — Jeremy A Luks
(74) *Attorney, Agent, or Firm* — Valeo Systemes Thermiques

(57)          ABSTRACT
The main subject matter of the invention is a ventilation device including at least one duct intended to channel an air flow in an air flow direction inside the duct, the ventilation device including at least one acoustic attenuation member at least partially arranged around the duct and made up of a network of resonators, each resonator having at least one cavity and one neck connecting the cavity to the duct, the resonators that make up the network of resonators being distributed at least parallel to the air flow direction. A distance separating two necks varies along a direction parallel to the air flow direction and in that a volume of the cavities varies along the direction parallel to the air flow direction.

19 Claims, 3 Drawing Sheets

(58) Field of Classification Search
CPC ..... F01N 1/023; F01N 1/026; F02M 35/1255;
F02M 35/1261; F02M 35/1266
USPC ........................................................ 181/224
See application file for complete search history.

(56) References Cited

U.S. PATENT DOCUMENTS

| | | | | |
|---|---|---|---|---|
| 4,106,587 | A * | 8/1978 | Nash ........................ | F02K 1/827 |
| | | | | 181/290 |
| 5,869,792 | A * | 2/1999 | Allen ................. | F16L 55/0333 |
| | | | | 181/224 |
| 6,116,375 | A * | 9/2000 | Lorch ................. | G10K 11/172 |
| | | | | 181/224 |
| 9,327,812 | B2 * | 5/2016 | Kim .......................... | F04D 3/00 |
| 9,376,946 | B1 * | 6/2016 | Eliers ................ | F16L 55/02781 |
| 2011/0088968 | A1 * | 4/2011 | Kempf .................... | F01N 1/026 |
| | | | | 181/250 |
| 2016/0097315 | A1 * | 4/2016 | Becker .................... | F01N 1/026 |
| | | | | 181/249 |
| 2020/0066245 | A1 * | 2/2020 | Lee ....................... | G10K 11/172 |

FOREIGN PATENT DOCUMENTS

| | | | | |
|---|---|---|---|---|
| JP | 2006337886 A | 12/2006 | | |
| JP | 2020012567 A | 1/2020 | | |
| WO | WO-2024079238 A1 * | 4/2024 | ............ | F16L 55/033 |

* cited by examiner

VENTILATION DEVICE FOR A VENTILATION, HEATING AND/OR AIR CONDITIONING SYSTEM OF A MOTOR VEHICLE

TECHNICAL FIELD

The present invention falls within the field of heating, ventilation and/or air-conditioning systems for a vehicle, and more particularly within the field of ventilation devices for such systems.

BACKGROUND OF THE INVENTION

The heating, ventilation and/or conditioned-air systems with which motor vehicles are equipped allow the users of the motor vehicle to control provision of cold air and/or hot air to various areas of the passenger compartment, such as around the driver's feet, onto a glazed surface of the vehicle and/or around the passengers. Circulating air through such heating, ventilation and/or conditioned-air systems promotes the emission of numerous acoustic waves when these systems force the circulation of air towards the passenger compartment, for example. The acoustic waves produced can cause discomfort to the driver and/or passengers.

It is thus known to equip these heating, ventilation and/or air-conditioning systems with at least one acoustic attenuation member in order to absorb a maximum of acoustic waves and reduce the discomfort experienced by the driver and/or passengers. In order to make it possible to reduce the acoustic waves experienced by the driver and/or passengers, this type of acoustic attenuation member comprises a Helmholtz module that absorbs the acoustic waves at a predefined frequency. Generally, the Helmholtz module absorbs a low-frequency acoustic wave. However, the circulation of the air causes acoustic waves over a range of frequencies, and in particular a range of low-frequency waves, and not over a specific frequency in particular.

In this context, the present invention proposes a solution that promotes the absorption of a maximum of acoustic waves over a predefined range of frequencies, thus making it possible to reduce the perception of these acoustic waves by the driver and/or passenger present in the passenger compartment.

BRIEF SUMMARY OF THE INVENTION

The main subject of the present invention is a ventilation device comprising at least one duct intended to channel a stream of air along an air flow direction in the duct, the ventilation device comprising at least one acoustic attenuation member disposed at least in part around the duct and made up of a network of resonators, each resonator comprising at least one cavity and one neck connecting the cavity to the duct, the resonators that constitute the network of resonators being distributed at least parallel to the air flow direction, characterized in that a distance separating two necks varies along a direction parallel to the air flow direction and in that a volume of the cavities and/or of the necks varies along the direction parallel to the air flow direction.

In other words, the distance measured between two first necks of two adjacent resonators that are aligned along the air flow direction is different from a distance measured between two other necks of adjacent resonators of the network of resonators that are aligned with the first two resonators. Similarly, the volume of a cavity of a first resonator is different from a volume of a cavity of another resonator aligned along the air flow direction with the first resonator.

It is understood that the network of resonators promotes the attenuation of the acoustic waves transported by the stream of air circulating in the duct and through the acoustic attenuation system. The latter absorbs a part of the acoustic waves in a frequency range that depends on the dimensions of the device, thus optimizing the experience of the driver and/or passengers of a vehicle.

Alternatively, it is also possible to vary the dimensions of the necks. A diameter of a first neck can be three and a half millimeters in diameter and ten millimeters, for example, in height, the height being measured along a main axis of extension of the neck.

According to one optional feature of the invention, the diameter of a neck is between two and a half millimeters and twenty millimeters.

According to one optional feature of the invention, the height of a neck is between one millimeter and twenty-five millimeters.

According to another optional feature of the invention, the network of resonators comprises a first row of substantially similar resonators extending along a first direction perpendicular to the air flow direction, the network of resonators comprising at least one second row of substantially similar resonators extending along a second direction perpendicular to the first direction and to the air flow direction.

According to another optional feature of the invention, the network of resonators is organized in the form of a matrix comprising at least two rows of resonators, and wherein the resonators of the at least two rows are respectively aligned along the air flow direction. It is understood that each resonator of one of the two rows of resonators is aligned with at least one resonator of the other of the two rows of resonators, along a direction perpendicular to the air flow direction.

According to one optional feature of the invention, the network of resonators comprises a first resonator, a second resonator and at least a third resonator, the second resonator being disposed between the first resonator and the third resonator in the direction parallel to the air flow direction, a first distance measured between the neck of the first resonator and the neck of the second resonator being greater than a second distance measured between the neck of the second resonator and the neck of the third resonator. The first distance and the second distance are measured along a direction parallel to the air flow direction, the first distance being measured between the center of the neck of the first resonator and the center of the neck of the second resonator, the second distance being measured between the center of the neck of the second resonator and the center of the neck of the third resonator.

According to another optional feature of the invention, the variation between the first distance and the second distance is between two and ten millimeters. In other words, the first distance exhibits a variation of two to ten millimeters with respect to the second distance, it being possible for this variation to be a sum or a difference.

According to another optional feature of the invention, the volume of a cavity of a first resonator situated upstream of a second resonator along the direction parallel to the air flow direction is greater than the volume of the cavity of the second resonator. In other words, the first resonator and the second resonator are aligned along a direction parallel to the air flow direction, the volume of the cavity of the first resonator being greater than the volume of the cavity of the second resonator.

According to another optional feature of the invention, the variation in volume between the cavity of the first resonator and the cavity of the second resonator is between two thousand two hundred and three thousand four hundred and fifty cubic millimeters. It is understood that the volume of each cavity of the resonator network comprises a volume between these two values.

According to another optional feature of the invention, a thickness of the cavity of the first resonator, measured parallel to the air flow direction, is greater than a thickness of the cavity of the second resonator, measured parallel to the air flow direction. The volume of the cavities thus varies via modifications of the dimension of the cavity measured along the direction parallel to the flow direction of the stream of air in the duct.

According to another optional feature of the invention, at least one cavity of the network of resonators has a rectangular section. Advantageously, the resonators of the network of resonators comprise a cavity having a rectangular section.

According to another optional feature of the invention, at least one cavity of the network of resonators has a generally parallelepipedal shape. Advantageously, the resonators of the network of resonators comprise a cavity that has a generally parallelepipedal shape.

According to another optional feature of the invention, the network of resonators comprises at least one row of substantially similar resonators extending along a direction perpendicular to the air flow direction.

According to another optional feature of the invention, the network of resonators is organized in the form of a matrix comprising for example eight rows of resonators, and wherein the resonators of the at least eight rows are respectively aligned along the air flow direction.

According to another optional feature of the invention, the acoustic attenuation system has a generally tubular shape of rectangular section, having at least one internal face that delimits the duct. Furthermore, the acoustic attenuation system comprises four walls that are perpendicular in pairs and each extend in a plane at least parallel to the air flow direction, the network of resonators extending at least over two of the walls of the acoustic attenuation system.

According to another optional feature of the invention, the network of resonators extends over four of the walls of the acoustic attenuation system.

According to another optional feature of the invention, a section of the acoustic attenuation system that is determined perpendicular to the air flow direction has a surface area of between eighty and one hundred and twenty cm$^2$.

Another subject of the present invention is a heating, ventilation and/or air-conditioning installation for a motor vehicle, which comprises a ventilation device as described in the present document, the ventilation device being installed at an air outlet of the heating, ventilation and/or air-conditioning installation.

BRIEF DESCRIPTION OF THE DRAWINGS

Further features, details and advantages of the invention will become more clearly apparent from reading the following description, and from a number of exemplary embodiments given by way of non-limiting indication, with reference to the appended schematic drawings, in which.

DETAILED DESCRIPTION OF THE INVENTION

The features, variants and various embodiments of the invention can be combined with one another, in various combinations, as long as they are not mutually incompatible or mutually exclusive. It will be possible, in particular, to imagine variants of the invention that comprise only a selection of the features described below, in isolation from the other features described, if this selection of features is sufficient to confer a technical advantage and/or to distinguish the invention from the prior art.

In the following description, the terms "longitudinal", "transverse" and "vertical" refer to the orientation of a ventilation device according to the invention. A longitudinal direction L corresponds to the main axis of extension of a duct of the ventilation device, this longitudinal direction being parallel to the longitudinal axis of a frame of reference L, V, T illustrated in the figures. A transverse direction T corresponds to a main direction of extension of an acoustic attenuation member of the ventilation device, this transverse direction being parallel to a transverse axis T of the frame of reference L, V, T illustrated in the figures, this transverse axis T being perpendicular to the longitudinal axis L. A vertical direction corresponds to a direction parallel to a vertical axis V of this frame of reference L, V, T, this vertical axis V being perpendicular to the longitudinal axis L and the transverse axis T.

Figure 1:
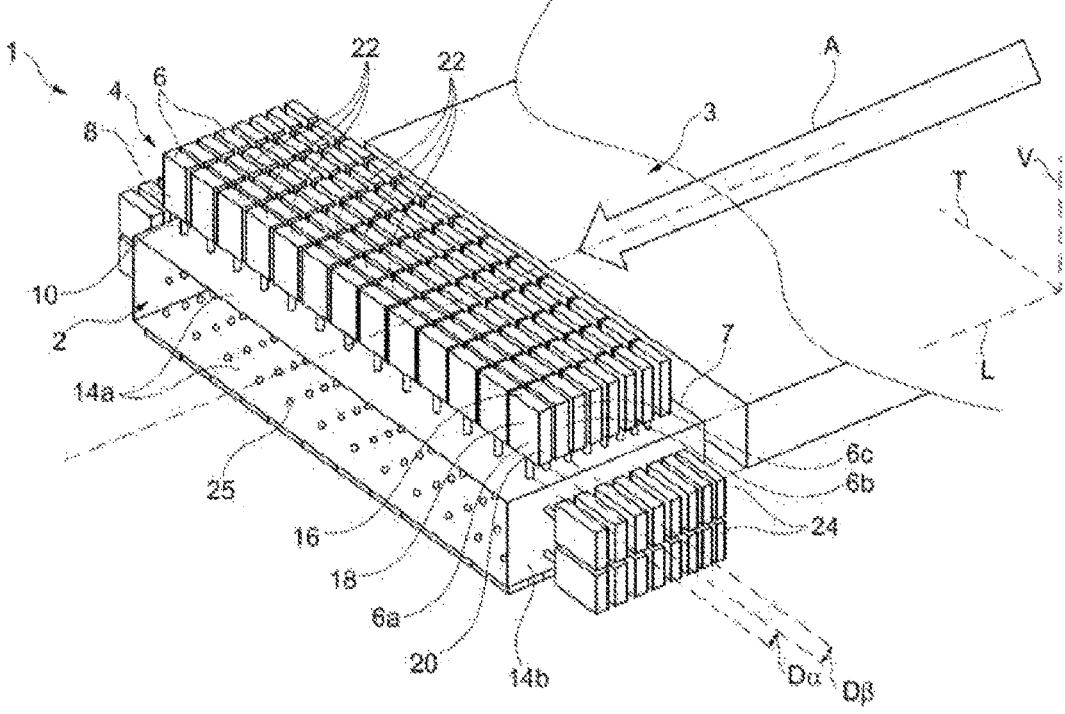
FIG. 1 is a perspective depiction of a ventilation device according to the invention.

FIG. 1 illustrates a ventilation device 1 according to the invention comprising at least one duct 2 intended to channel a stream of air along an air flow direction A in said duct 2, the air flow direction A being parallel to the longitudinal direction L. The ventilation device 1 is configured to cooperate with a heating, ventilation and/or conditioned-air system 3 installed in a motor vehicle, for example. The heating, ventilation and/or conditioned-air system 3 forces the circulation of a stream of air from the outside of the vehicle and/or from the inside of the vehicle to the passenger compartment of the vehicle. The heating, ventilation and/or conditioned-air system 3 is also configured to be able to heat and/or cool the stream of air that is circulated. The duct 2 of the ventilation device 1 contributes to guiding the stream of air from the heating, ventilation and/or conditioned-air system 3 to the passenger compartment of the vehicle, for example.

The duct 2 extends at least in part along the air flow direction A and has at least one opening 7 of rectangular section. Advantageously, the duct 2 has the general shape of a tube also having a rectangular section. However, a duct 2 having a circular or even triangular section would not constitute a departure from the scope of the invention.

As illustrated in FIG. 1, the ventilation device 1 comprises at least one acoustic attenuation system 4 disposed at least in part around the duct 2. According to the example in FIG. 1, the acoustic attenuation system 4 is disposed all around the duct 2. More particularly, the acoustic attenuation system 4 comprises at least two longitudinal walls 14a extending in a plane parallel to the longitudinal direction L and transverse direction T, and two vertical walls 14b extending in a plane parallel to the longitudinal direction L and vertical direction V, each of the walls 14a, 14b of the acoustic attenuation system 4 delimiting the duct 2. The acoustic attenuation system 4 is configured to absorb at least a part of the acoustic waves that originate from the ventilation device 1. According to this example, the longitudinal walls 14*a* and the vertical walls 14*b* can constitute the duct 2, the acoustic attenuation system 4 then being disposed around the duct 2, i.e. on its periphery.

A section of the acoustic attenuation system 4 that is determined perpendicular to the air flow direction A has a surface area of between eighty and one hundred and twenty cm². This surface area corresponds to a surface of the duct 2 that is projected on a plane perpendicular to the flow direction A, and bordered by the four walls of the acoustic attenuation system 4.

The acoustic attenuation system 4 is at least made up of a network of resonators 6 configured to attenuate the acoustic waves transported through the stream of air circulating in the duct 2. This or these resonators are Helmholtz resonators.

According to the invention, the network of resonators 6 extends at least along two of the walls 14*a*, 14*b* of the acoustic attenuation system 4. Advantageously, the network of resonators 6 extends along the four walls 14*a*, 14*b* contributing to forming a closed periphery of the acoustic attenuation system 4. However, an acoustic attenuation system 4 at which the network of resonators 6 extends over one, two or three walls 14*a*, 14*b* contributing to forming the acoustic attenuation system 4 would not constitute a departure from the scope of the invention.

Each resonator 6 comprises at least one cavity 8 and one neck 10 connecting the cavity 8 to the duct 2. It is understood from this that the network of resonators 6 is disposed around the longitudinal walls 14*a* and/or vertical walls 14*b* while at the same time being in aeraulic communication with the volume delimited by the duct 2 where the stream of air circulates. Each cavity 8 of the network of resonators 6 comprises a space that is open only onto the inside of the duct 2, via the neck 10. The latter has the general shape of a tube of circular section opening, on the one hand, into the space delimited by the cavity 8 and, on the other hand, inside the duct 2, via a mouth 25 visible in FIGS. 2 and 3.

It will be noted that the resonators 6 are illustrated schematically in FIG. 1, in particular depicting only the volume of the cavity and the volume of the neck, and disregarding a material that of course delimits these volumes. In other words, and although invisible in FIG. 1, the cavities 8 and the necks 10 are embedded in a synthetic material that constitutes the acoustic attenuation system 4.

The resonators 6 that constitute the network of resonators 6 are distributed at least parallel to the air flow direction A. In other words, the network of resonators 6 comprises at least two resonators 6 that are aligned along a direction parallel to the air flow direction A. More specifically, the necks 10 of these resonators 6 are aligned along this direction parallel to the air flow direction A.

Figure 2:
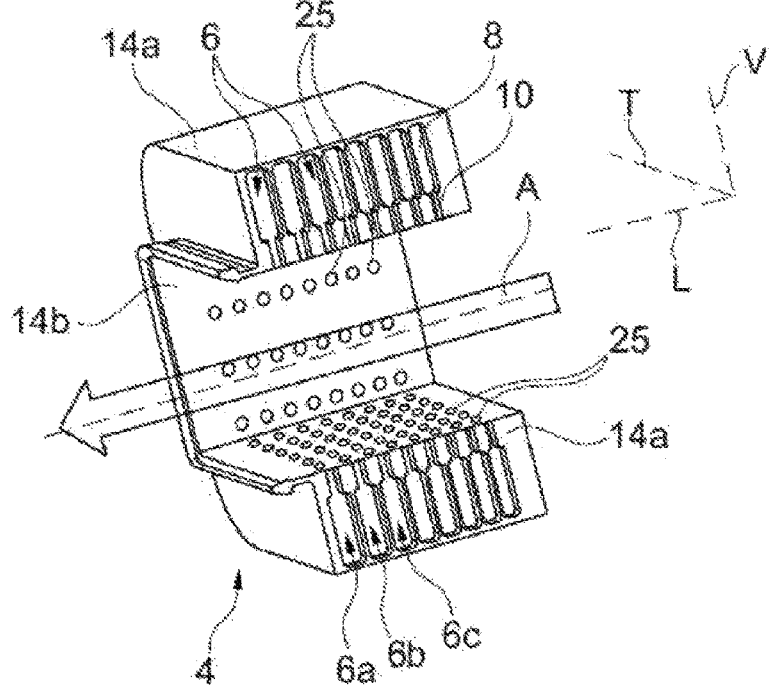
FIG. 2 is a longitudinal cross section of an attenuation member of the ventilation device illustrated in FIG. 1.
Figure 3:
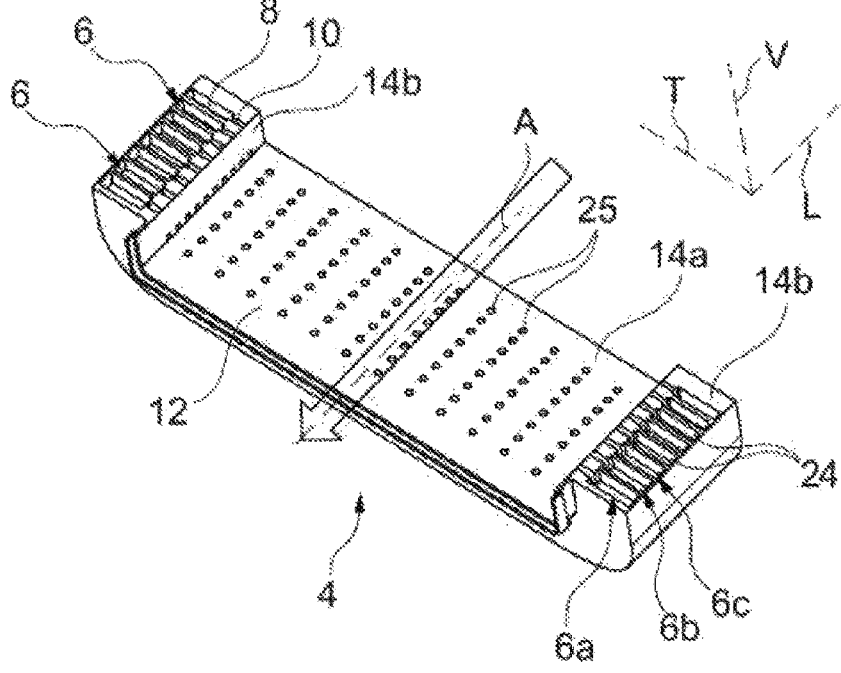
FIG. 3 is a transverse cross section of an attenuation member of the ventilation device illustrated in FIG. 1.

As illustrated here in FIGS. 1 to 3, the network of resonators 6 comprises for example eight resonators 6 that are aligned with one another along a direction parallel to the air flow direction A.

According to the invention, a distance separating the necks 10 of three aligned resonators 6 varies along the direction parallel to the air flow direction A. In other words, the distance measured between two first necks 10 of two adjacent resonators 6 that are aligned along the air flow direction A is different from a distance measured between two other necks 10 of adjacent resonators 6 of the network of resonators 6 that are aligned with the first two resonators 6.

More specifically, the network of resonators 6 comprises a first resonator 6*a*, a second resonator 6*b* and at least a third resonator 6*c*, the second resonator 6*b* being disposed between the first resonator 6*a* and the third resonator 6*c* in the air flow direction A. Thus, the first resonator 6*a*, the second resonator 6*b* and the third resonator 6*c* are aligned along the direction parallel to the air flow direction A. According to the invention and as is more particularly visible in FIG. 1, a first distance Da measured between the neck 10 of the first resonator 6*a* and the neck 10 of the second resonator 6*b* is greater than a second distance DB measured between the neck 10 of the second resonator 6*b* and the neck 10 of the third resonator 6*c*. It is understood that the first distance Da and the second distance DB are measured along the direction parallel to the air flow direction A from an identical point of each neck, for example the center of these.

According to an exemplary embodiment of the invention, in which the targeted frequency range is from 800 Hz to 1000 Hz, the first distance Da corresponds to a value of approximately 9.55 millimeters while the second distance DB corresponds to a value of approximately 9.30 millimeters, a difference between the first and the second distance Da, DB being 0.25 millimeters.

According to the invention, the variation between the first distance Da and the second distance DB is for example between 0.2 and 1.0 mm. Moreover, this variation can be ordered in an increasing or decreasing manner, i.e. the variation in the distance between the necks 10 tends to increase or decrease to a greater or lesser extent along the air flow direction A, independently of the values given here by way of example.

It is understood from the foregoing that, for example, the variation between the first distance Da and the second distance DB is greater than the variation between the second distance DB and the distance measured between the neck 10 of the third resonator 6*c* and the neck 10 of a fourth resonator, the variation thus tending to decrease moving away from the first resonator 6*a*. According to a variant of the invention, the variation in distance can tend to increase moving away from the first resonator 6*a*.

According to the invention, a volume of the cavities 8 varies along the direction parallel to the air flow direction A. The volume of a cavity 8 of a first resonator 6*a* is different from a volume of a cavity 8 of another resonator that is aligned along the air flow direction A with the first resonator 6*a*. According to the invention, the volume of a cavity 8 of a first resonator 6*a* situated downstream, in the direction of movement of the air along the air flow direction A is greater than the volume of the cavity 8 of the second resonator. Moreover, the variation in the various volumes of the cavities 8 of the resonators 6 can vary in an increasing or decreasing manner, i.e. the variation in the volumes of the cavities 8 between the resonators 6 tends to increase or decrease to a greater or lesser extent along the air flow direction A moving away from the first resonator 6*a*.

According to the example illustrated in FIGS. 1 to 3, the volume of the cavity 8 of the first resonator 6*a* corresponds to a value of approximately three thousand four hundred and twenty (3420) mm3 while the volume of the cavity 8 of the second resonator 6*b* corresponds to a value of approximately three thousand three hundred and seventy-five (3375) mm3, a difference between the volume of the cavity 8 of the first resonator 6*a* and the volume of the cavity 8 of the second resonator 6*b* being forty-five (45) mm3.

According to the invention, in the frequency range from 800 Hz to 1000 Hz, the variation in volume between the cavity 8 of the first resonator 6*a* and the cavity 8 of the second resonator 6*b* is for example between two hundred (200) and ten thousand (10000) mm3. In other words, the volume of each cavity 8 of the network of resonators 6 is advantageously between two hundred (200) and ten thousand (10000) mm3. This range of volume values corresponds to the volume of the cavity 8 necessary to allow at least partial absorption of the acoustic waves transported in the duct 2. The combination of the variation in the volumes of the cavities 8 and the variation in the distances between the necks 10 of the various resonators 6 promote the absorption of the acoustic waves by increasing the range of values of the frequencies of the acoustic waves absorbed by the network of resonators 6.

Alternatively, it is also possible to vary the dimensions of the necks 10. In this example, a diameter of a first neck is three and a half millimeters in diameter and ten millimeters, for example, in height. The diameters of the necks 10 are, for example, between two and a half millimeters and twenty millimeters. The height of the necks is, for example, between one millimeter and twenty-five millimeters.

According to the invention, at least one dimension of the cavity 8 of the first resonator 6*a* is greater than a dimension of the cavity 8 of the second resonator 6*b*. Dimension is understood to mean a distance measured along a direction parallel to the longitudinal direction L or to the transverse direction T or to the vertical direction V between two points of the cavity 8, this distance being used to calculate the volume of the cavity 8. According to the example illustrated in FIGS. 1 to 3, the dimension is in this case a thickness measured parallel to the longitudinal direction L and to the air flow direction A. Moreover, two or more dimensions of the cavity 8 of the first resonator 6*a* can be greater than these same dimensions of the cavity 8 of the second resonator 6*b* without however departing from the scope of the invention.

As illustrated in FIG. 1, at least one cavity 8 of the network of resonators 6 has a rectangular section. Advantageously, all of the resonators 6 of the network of resonators 6 extend in a generally parallelepiped shape, having at least two longitudinal faces 16 extending parallel to the longitudinal direction L and transverse direction T, two transverse faces 18 extending parallel to the transverse direction T and vertical direction V and two vertical faces 20 extending parallel to the vertical direction V and longitudinal direction L. It is understood that the resonators 6 are aligned with one another along the air flow direction A such that at least one of the transverse faces 18 of each cavity 8 of the network of resonators 6 faces another transverse face 18 of a cavity 8 of an immediately adjacent resonator 6.

As is more particularly visible in FIG. 1, the network of resonators 6 comprises at least one row of substantially similar resonators 6 extending along a direction perpendicular to the air flow direction A. In other words, this row of resonators 6 extends along the transverse direction T or along the vertical direction V. According to the example illustrated here, the network of resonators 6 comprises a transverse row 22 of resonators 6 extending along the transverse direction T, and a vertical row 24 of resonators 6 extending along the vertical direction V. The resonators 6 of the transverse row 22 are disposed such that at least one vertical face 20 of each cavity 8 of these resonators 6 faces another vertical face 20 of a cavity 8 of a resonator of the transverse row 22. Similarly, the resonators 6 of the vertical row 24 are disposed such that at least one longitudinal face 16 of each cavity 8 of these resonators 6 faces another longitudinal face 16 of a cavity 8 of a resonator of the transverse row 22.

According to one embodiment of the invention, the network of resonators 6 is organized in the form of a matrix comprising at least two rows of resonators 6, and wherein the resonators 6 of the at least two rows are respectively aligned along the air flow direction A. In other words, the network of resonators 6 comprises at least two transverse rows 22 and/or two vertical rows 24 as described above. In this configuration, each cavity 8 of a resonator 6 comprises at least one longitudinal face 18 facing a longitudinal face 18 of a cavity 8 of another resonator 6, and at least one vertical face 20 or one longitudinal face 16 facing respectively a vertical face 20 or a longitudinal face 16 of a cavity 8 of another resonator 6. Advantageously and as illustrated here in FIG. 1, the network of resonators 6 comprises at least eight transverse rows 22 and at least eight vertical rows 24.

According to a preferred embodiment of the invention, the longitudinal walls 14*a* of the acoustic attenuation system 4 each comprise eight transverse rows 22 of resonators 6 and the vertical walls 14*b* of the acoustic attenuation system 4 each comprise eight vertical rows 24 of resonators 6, each of the transverse rows 22 for its part comprising thirteen resonators 6 and each of the vertical rows 24 comprising two resonators 6. The acoustic attenuation system 4 therefore in this case comprises two hundred and forty resonators 6 organized in the form of a matrix around the duct 2. However, the total number of resonators 6 making up the acoustic attenuation system 4 can vary in order to adapt the range of the frequency values of acoustic waves to be attenuated.

The invention is not, however, limited to the means and configurations described and illustrated here, and also extends to any equivalent means or configuration described and illustrated here, and also extends to any equivalent means or configuration and to any technically operational combination of such means. For example, the number of resonators or of rows of resonators and the dimensions of the cavities or necks can vary without however departing from the scope of the invention.

What is claimed is:

1. A ventilation device comprising at least one duct intended to channel a stream of air along an air flow direction in the at least one duct, the at least one duct including two longitudinal walls and two vertical walls, at least one acoustic attenuation system disposed at least in part around the at least one duct and made up of a network of resonators extending along at least three walls of the two longitudinal walls and two vertical walls of the at least one duct, each resonator including at least one cavity and one neck connecting the at least one cavity to the at least one duct, the resonators of the network of resonators being distributed at least parallel to the air flow direction, wherein a distance separating necks of a pair of subsequent resonators of the network of resonators varies along a direction parallel to the air flow direction compared to a distance separating necks of another pair of subsequent resonators of the network of resonators, wherein a volume of at least two cavities varies along the direction parallel to the air flow direction.

2. The ventilation device as claimed in claim 1, wherein the network of resonators includes a first row of substantially similar resonators extending along a direction perpendicular to the air flow direction.

3. The ventilation device as claimed in claim 2, wherein the network of resonators includes a second row of substantially similar resonators extending along a direction perpendicular to the air flow direction, wherein the network of resonators is organized in the form of a matrix including the first row of resonators and the second row of resonators, and wherein the resonators of the first and second rows of resonators are respectfully aligned along the air flow direction.

4. The ventilation device as claimed in claim 1, wherein the network of resonators includes a first resonator, a second resonator and at least a third resonator, the second resonator being disposed between the first resonator and the third resonator in the direction parallel to the air flow direction, a first distance measured between the neck of the first resonator and the neck of the second resonator being greater than a second distance measured between the neck of the second resonator and the neck of the third resonator.

5. The ventilation device as claimed in claim 4, wherein the variation between the first distance and the second distance is between 0.2 and 1.0 millimeters.

6. The ventilation device as claimed in claim 1, wherein the network of resonators includes a first resonator and a second resonator, wherein the volume of at least one cavity of a first resonator situated upstream of a second resonator along the direction parallel to the air flow direction is greater than the volume of the neck of the second resonator.

7. The ventilation device as claimed in claim 1, wherein the network of resonators includes a first resonator and a second resonator, wherein the variation in volume between the at least one cavity of the first resonator and the at least one cavity of the second resonator is between 200 and 10,000 mm³.

8. The ventilation device as claimed in claim 1, wherein the network of resonators includes a first resonator and a second resonator, wherein a thickness of the at least one cavity of the first resonator, measured parallel to the air flow direction, is greater than a thickness of the at least one cavity of the second resonator, measured parallel to the air flow direction.

9. The ventilation device as claimed in claim 1, wherein at least one cavity of the network of resonators has a rectangular section.

10. The ventilation device as claimed in claim 1, wherein the at least one acoustic attenuation system has the general shape of a duct having at least one internal face that delimits the at least one duct.

11. The ventilation device as claimed in claim 1, wherein the network of resonators includes a first resonator and a second resonator, wherein the volume of the neck of a first resonator situated upstream of a second resonator along the direction parallel to the air flow direction is greater than the volume of the neck of the second resonator.

12. The ventilation device as claimed in claim 1, the network of resonators extending along four walls of the two longitudinal walls and two vertical walls of the at least one duct.

13. The ventilation device as claimed in claim 1, wherein the at least one duct has the shape of a tube and includes a rectangular section.

14. A heating, ventilation and/or air-conditioning installation for a motor vehicle, comprising a ventilation device including at least one duct intended to channel a stream of air along an air flow direction in the at least one duct, the at least one duct including two longitudinal walls and two vertical walls, at least one acoustic attenuation system disposed at least in part around the at least one duct and made up of a network of resonators extending along at least three walls of the two longitudinal walls and two vertical walls of the at least one duct, each resonator including at least one cavity and one neck connecting the at least one cavity to the at least one duct, the resonators of the network of resonators being distributed at least parallel to the air flow direction, wherein a distance separating necks of a pair of subsequent resonators of the network of resonators varies along a direction parallel to the air flow direction compared to a distance separating necks of another pair of subsequent resonators of the network of resonators, wherein a volume of at least two cavities varies along the direction parallel to the air flow direction.

15. A ventilation device comprising at least one duct intended to channel a stream of air along an air flow direction in at least one duct, the at least one duct including two longitudinal walls and two vertical walls, at least one acoustic attenuation system disposed at least in part around the at least one duct and made up of a network of resonators extending along at least three walls of the two longitudinal walls and two vertical walls of the at least one duct, each resonator including at least one cavity and one neck connecting the at least one cavity to the at least one duct, the resonators of the network of resonators being distributed at least parallel to the air flow direction, wherein a distance separating necks of a pair of subsequent resonators of the network of resonators varies along a direction parallel to the air flow direction compared to a distance separating necks of another pair of subsequent resonators of the network of resonators, wherein a volume of at least two necks varies along the direction parallel to the air flow direction.

16. The ventilation device as claimed in claim 15, the network of resonators extending along four walls of the two longitudinal walls and two vertical walls of the at least one duct.

17. The ventilation device as claimed in claim 15, wherein the at least one duct has the shape of a tube and includes a rectangular section.

18. The ventilation device as claimed in claim 15, wherein the network of resonators includes a first row of substantially similar resonators extending along a direction perpendicular to the air flow direction.

19. The ventilation device as claimed in claim 18, wherein the network of resonators includes a second row of substantially similar resonators extending along a direction perpendicular to the air flow direction, wherein the network of resonators is organized in the form of a matrix including the first row of resonators and the second row of resonators, and wherein the resonators of the first and second rows of resonators are respectfully aligned along the air flow direction.

* * * * *